United States Patent
Oohashi et al.

(10) Patent No.: US 6,369,485 B1
(45) Date of Patent: *Apr. 9, 2002

(54) ROTOR STRUCTURE

(75) Inventors: Atsushi Oohashi; Yoshihito Asao; Kenji Tsuruhara; Kyoko Higashino, all of Tokyo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/477,347

(22) Filed: Jan. 4, 2000

(30) Foreign Application Priority Data

Sep. 7, 1999  (JP) ............................................. 11-253477

(51) Int. Cl.⁷ .............................. H02K 1/28; H02K 1/27; H02K 5/02
(52) U.S. Cl. .............. 310/263; 310/156.72; 310/156.66; 310/52
(58) Field of Search ................................ 310/263, 156, 310/52, 61, 269

(56) References Cited

U.S. PATENT DOCUMENTS

| 4,617,485 A | * | 10/1986 | Nakamura et al. ............ 310/65 |
| 5,306,977 A | * | 4/1994 | Hayashi ...................... 310/263 |
| 5,903,084 A | | 5/1999 | Asao et al. .................. 310/263 |
| 5,925,964 A | * | 7/1999 | Kusase et al. ............... 310/263 |

FOREIGN PATENT DOCUMENTS

| DE | 198 02 785 A | 8/1999 | ............. H02K/1/28 |
| EP | 0 762 601 A1 | 3/1997 | ............. H02K/1/24 |
| JP | 11-136913 | 5/1999 | .......... H02K/19/22 |

* cited by examiner

Primary Examiner—Burton S. Mullins
(74) Attorney, Agent, or Firm—Sughrue Mion, PLLC

(57) ABSTRACT

A rotor structure comprising magnets for suppressing the leakage of a magnetic flux between the side faces of the adjacent claw-like magnetic poles and metal holding members each of which covers the magnets together with the claw-like magnetic pole and radiates heat transmitted to the claw-like magnetic pole at the time of power generation. Therefore, the quantity of heat radiated to the peripheral portions of the magnets is increased and the coolability of the magnets can be greatly improved.

14 Claims, 17 Drawing Sheets

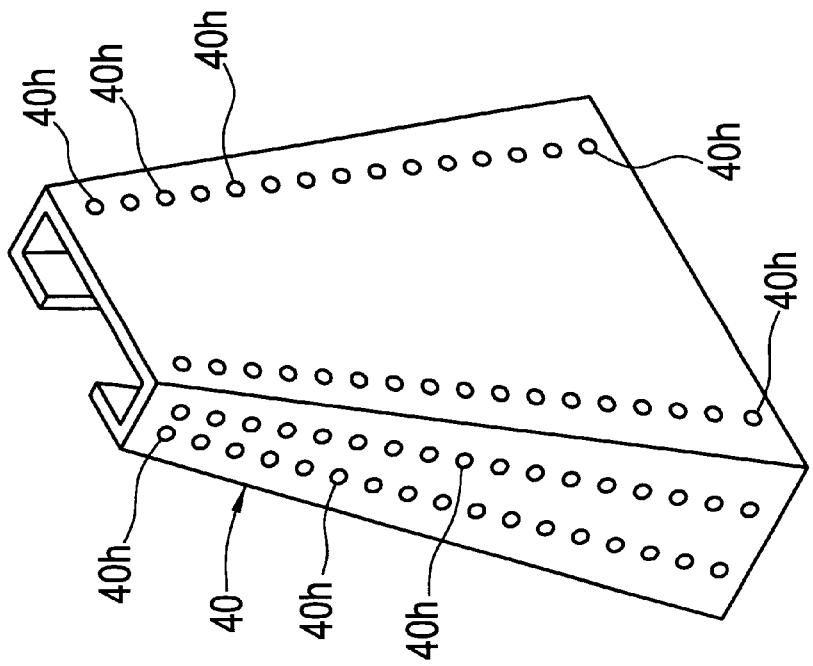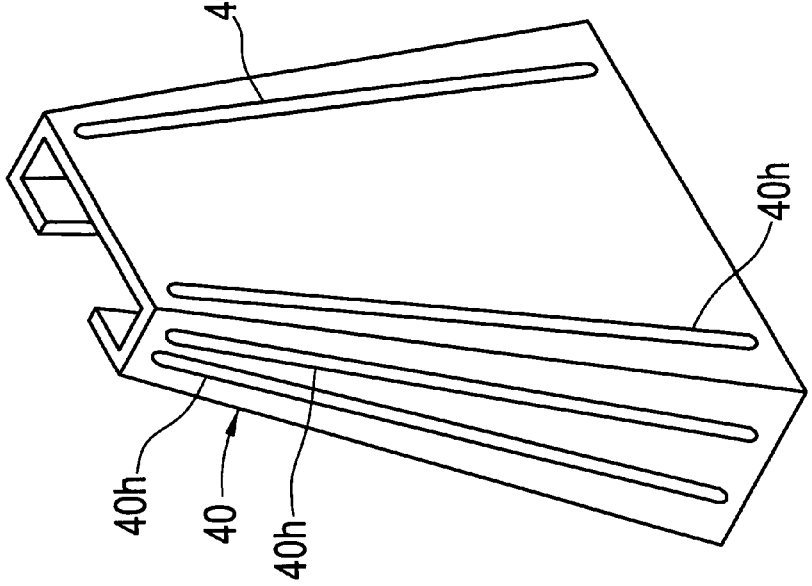

ROTOR STRUCTURE

BACKGROUND OF THE INVENTION

1. Field of the Invention

The present invention relates to a rotor structure for an AC generator or a motor and, particularly, to a structure for attaching magnets for preventing the leakage of a magnetic flux between claw-like magnetic poles.

2. Description of the Prior Art

FIG. 13 is a sectional side view showing the constitution of a conventional rotor structure for an AC generator or a motor, FIG. 14 is a perspective view showing the constitution of this rotor, FIG. 15 is an exploded side view of individual parts of the rotor, and FIG. 18 is a sectional view in a radial direction of the claw-like magnetic poles of the rotor.

As shown in FIG. 13, this generator comprises a case 3 consisting of an aluminum front bracket 1 and an aluminum rear bracket 2, a shaft 6 which is installed in the case 2 and one end of which is fitted with a pulley 4, a Randle type rotor 7 fixed to the shaft 6, fans 5 fixed to both end surfaces of the rotor 7, a stator 8 fixed to the inner wall of the case 3, slip rings 9 which are fixed to the other end of the shaft 6 and supply a current to the rotor 7, a pair of brushes 10 in sliding contact with the slip rings 9, a brush holder 11 for storing the brushes 10, a rectifier 12 which is electrically connected to the stator 8 and rectifies an alternating current generated in the stator 8 into a direct current, a heat sink 19 attached to the brush holder 11, and a regulator 20 which is attached to the heat sink 19 and regulates an AC voltage generated in the stator 8.

The stator 8 comprises a stator core 15 and a stator coil 16 which is wound around the stator core 15 and which generates an alternating current by a change in magnetic flux from a rotor coil 13 caused by the rotation of the rotor 7.

The rotor 7 comprises the cylindrical rotor coil 13 for generating a magnetic flux with a current and a pole core 14 which covers the rotor coil 13 and forms a magnetic pole with the magnetic flux of the rotor coil 13.

The pole core 14 consists of a first pole core body 21 and a second pole core body 22 which are mated with each other.

The pole core body 21 and the pole core body 22 are generally made from iron and consist of cylindrical portions 21e and 22e wound with the rotor coil 13 and disk-like base portions 21k and 22k from which the cylindrical portions 21e and 22e project, respectively. The base portions 21k and 22k have at their peripheries a plurality of claw-like magnetic poles 23 and 24 which mate with each other between the outer wall of the rotor coil 13 and the inner wall of the stator 8, respectively.

The thickness and width of each of the claw-like magnetic poles 23 and 24 are large on base portion 21k and 22k sides and become smaller toward the end sides. The inner faces 23a and 24a of the claw-like magnetic poles 23 and 24 are arched in conformity with the peripheral surface of the rotor coil 13 and the outer faces 23b and 24b of the claw-like magnetic poles 23 and 24 are arched in conformity with the inner wall of the stator 8. Each of the claw-like magnetic poles 23 and 24 has two trapezoidal side faces 23c and 24c in a circumferential direction of the rotor 7.

As shown in FIG. 14, a rectangular magnet 30A magnetized to suppress the leakage of a magnetic flux between the opposed side faces 23c and 24c is fixed between the adjacent claw-like magnetic poles 23 and 24. A ring-shaped magnet and a ring-shaped magnet packed in other resin are available in addition to the rectangular magnet 30A to be inserted between the claw-like magnetic poles 23 and 24.

A description is subsequently given of the operation of the generator. A current is supplied from an unshown battery to the rotor coil 13 through the brushes 10 and the slip rings 9 to generate a magnetic flux, whereby the claw-like magnetic poles 23 of the first pole core body 21 are magnetized to an N pole and the claw-like magnetic poles 24 of the second pole core body 22 are magnetized to an S pole. Meanwhile, the pulley 4 is turned by the rotation force of an engine and the rotor 7 is turned by the shaft 6, thereby generating electromotive force in the stator coil 16. The electromotive force of this, alternating current is rectified into a direct current by the rectifier 12, regulated by the regulator 20 and charged into the unshown battery.

However, the following problem may occur. That is, end portions of the claw-like magnetic poles 23 and 24 are moved toward the rotor coil 13 and the stator 8 by centrifugal force generated by the rotation of the rotor 7 and the magnetic attraction force of the stator 8 at the time of power generation. Thereby, a load is applied to the magnet 30A between the claw-like magnetic poles 23 and 24, whereby the magnet 30A may be distorted or broken at about 10,000 to 15,000 rpm.

A countermeasure against this is disclosed by Japanese Laid-open Patent Application No. 11-136913. In this publication, a magnet 30B is formed as shown in FIG. 16, FIG. 17 and FIG. 19. That is, the magnet 30B is fixed to each of the claw-like magnetic poles 23 and 24 in such a manner that it covers the inner faces 23a and 24a and the side faces 23c and 24c of the claw-like magnetic poles 23 and 24. A space 25 is formed between the adjacent magnets 30B. Thereby, a set of the claw-like magnetic pole 23 and the magnet 30B and a set of the claw-like magnetic pole 24 and the magnet 30B move independently, thereby preventing the application of a load to the magnet 30B and the breakage of the magnet 30B.

SUMMARY OF THE INVENTION

However, in the prior art generator, as shown in FIG. 19, the magnets 30B are provided for the claw-like magnetic poles 23 and 24 in such a manner that they cover the inner faces 23a and 24a and side faces 23c and 24c of the claw-like magnetic poles 23 and 24. Therefore, as shown in FIG. 18, compared with the rectangular magnet 30A interposed between the adjacent claw-like magnetic poles 23 and 24, the claw-like magnetic poles 23 and 24 are not cooled well because the magnets 30B surround the claw-like magnetic poles 23 and 24.

Therefore, the coolability of the magnet 30B deteriorates and the temperature of the magnet 30B rises, thereby reducing magnetic force. Further, when the temperature rises and becomes higher than the thermal deformation temperature of the magnet 30B, the magnet 30B is broken.

The present invention which has been made to solve the above problems improves the coolability of magnets provided to suppress the leakage of a magnetic flux between claw-like magnetic poles and prevents a reduction in magnetic force to suppress deterioration in the output of an AC generator.

According to a first aspect of the present invention, there is provided a rotor structure comprising a rotor coil for generating a magnetic flux with a current, a pole core which is provided to cover the rotor coil and consists of a first pole core body and a second pole core body, each having claw-like magnetic poles which are situated to mate with each other at positions where they cover the peripheral surface of the rotor coil, magnets which are provided on both sides of each of the claw-like magnetic poles and suppress the leakage of a magnetic flux between the side faces of the adjacent claw-like magnetic poles, and metal holding members each of which fixes the magnets to each of the claw-like magnetic poles in such a manner that it covers the magnets together with the claw-like magnetic pole and radiates heat transmitted to the claw-like magnetic pole at the time of power generation to cool the magnets.

According to a second aspect of the present invention, there is provided a rotor structure, wherein an exposing portion for exposing part of the peripheral surface of the magnet is formed in the holding member to contact the peripheral surface of the magnet to cooling air.

According to a third aspect of the present invention, there is provided a rotor structure, wherein the surface area of the holding member is increased to improve its coolability.

According to a fourth aspect of the present invention, there is provided a rotor structure, wherein projecting pieces are formed on the holding member or the holding member is formed wavy or uneven to increase its surface area in order to improve its coolability.

According to a fifth aspect of the present invention, there is provided a rotor structure, wherein the root portion or end portion of the holding member is extended in the axial directions of the first and second pole core bodies and projected from the claw-like magnetic poles.

According to a sixth aspect of the present invention, there is provided a rotor structure, wherein the extension of the root portion or end portion of the holding member projects from the end surface of the first or second pole core body.

According to a seventh aspect of the present invention, there is provided a rotor structure, wherein a cooling fan is formed on the extension of the root portion or end portion of the holding member which projects from the end surface of the pole core The above and other objects, features and advantages of the invention will become more apparent from the following description when taken in conjunction with the accompanying drawings.

BRIEF DESCRIPTION OF THE ACCOMPANYING DRAWINGS

Figure 7:
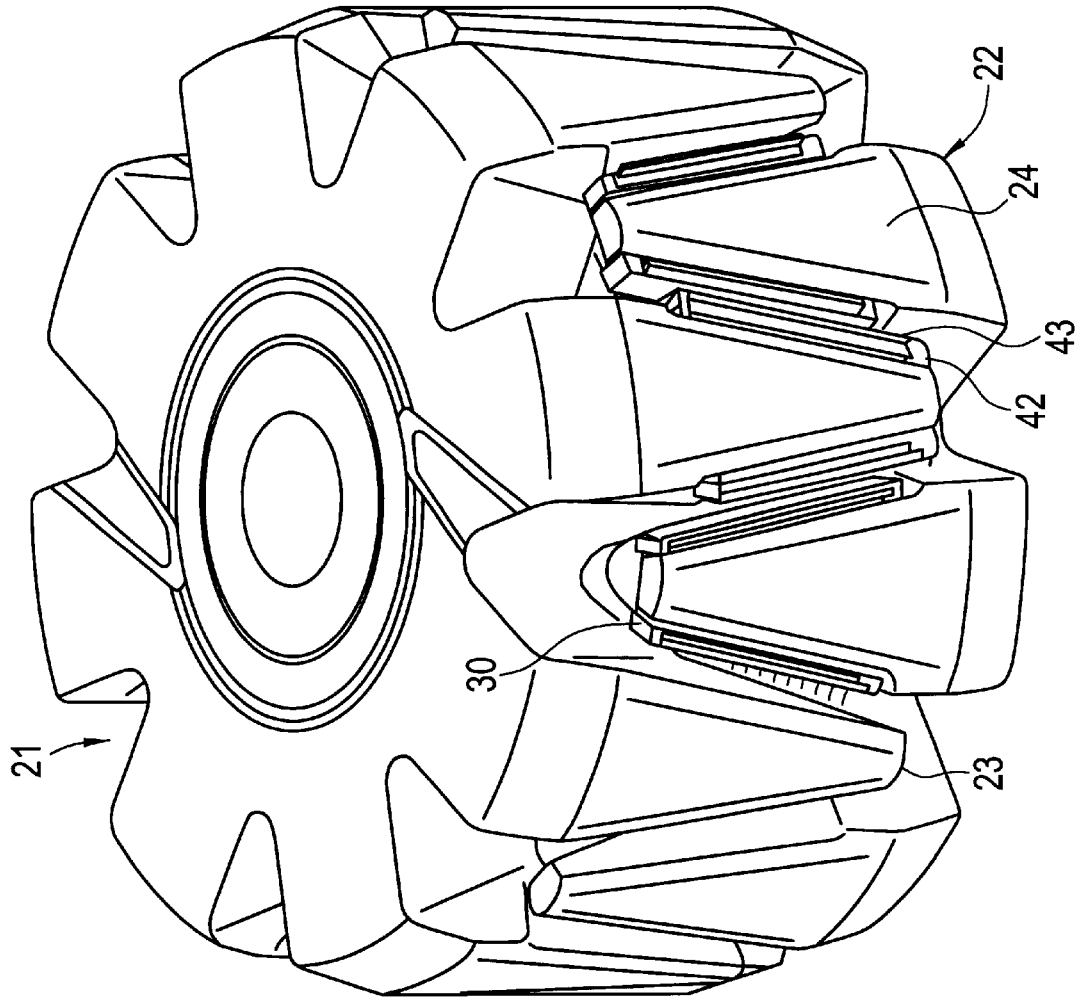
Figure 8:
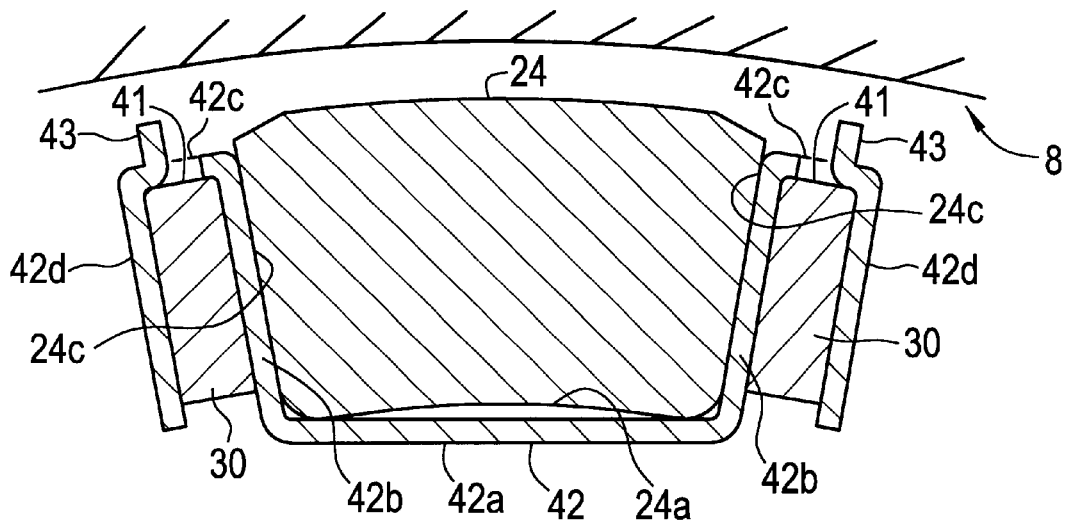
Figure 10:
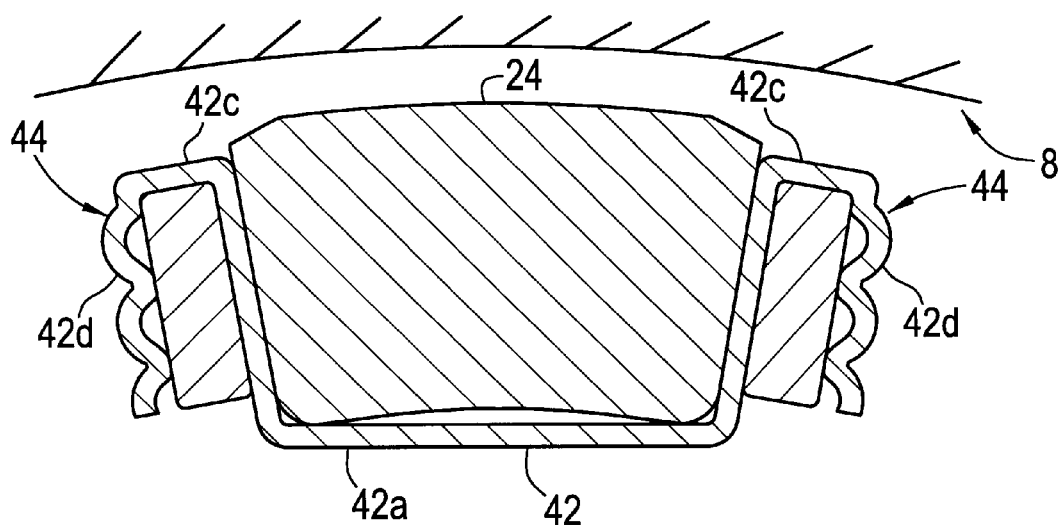
Figure 9:
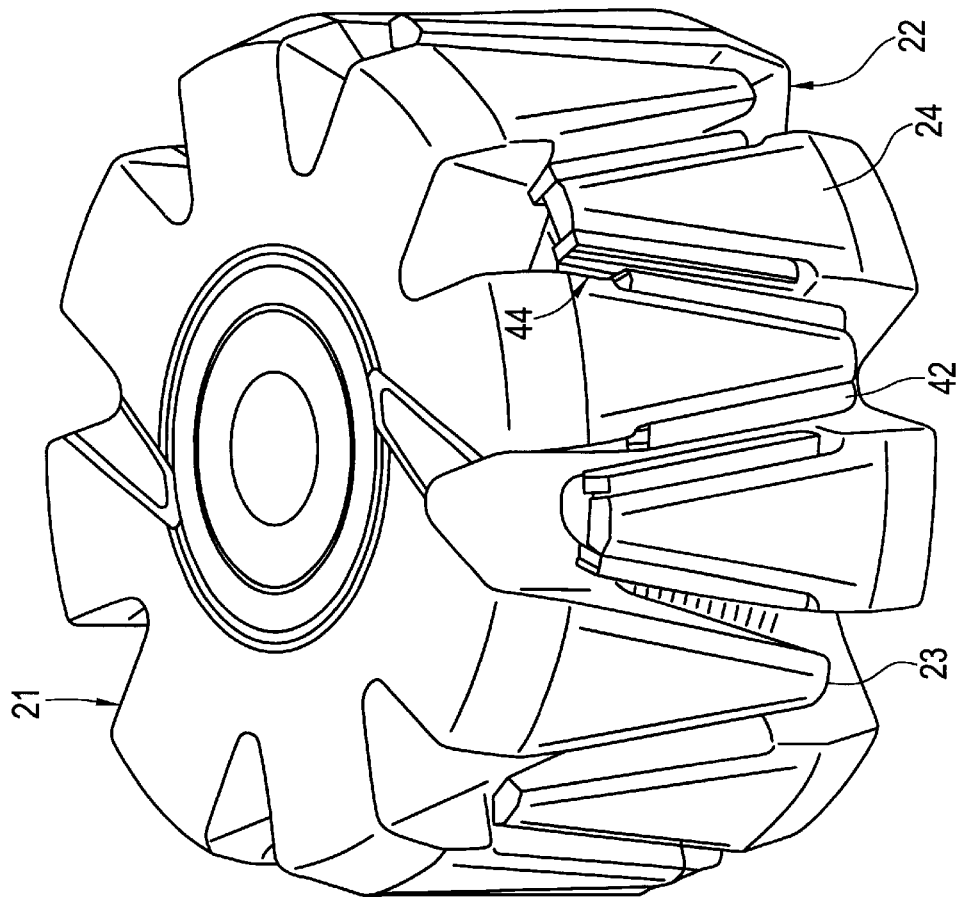
Figure 11:
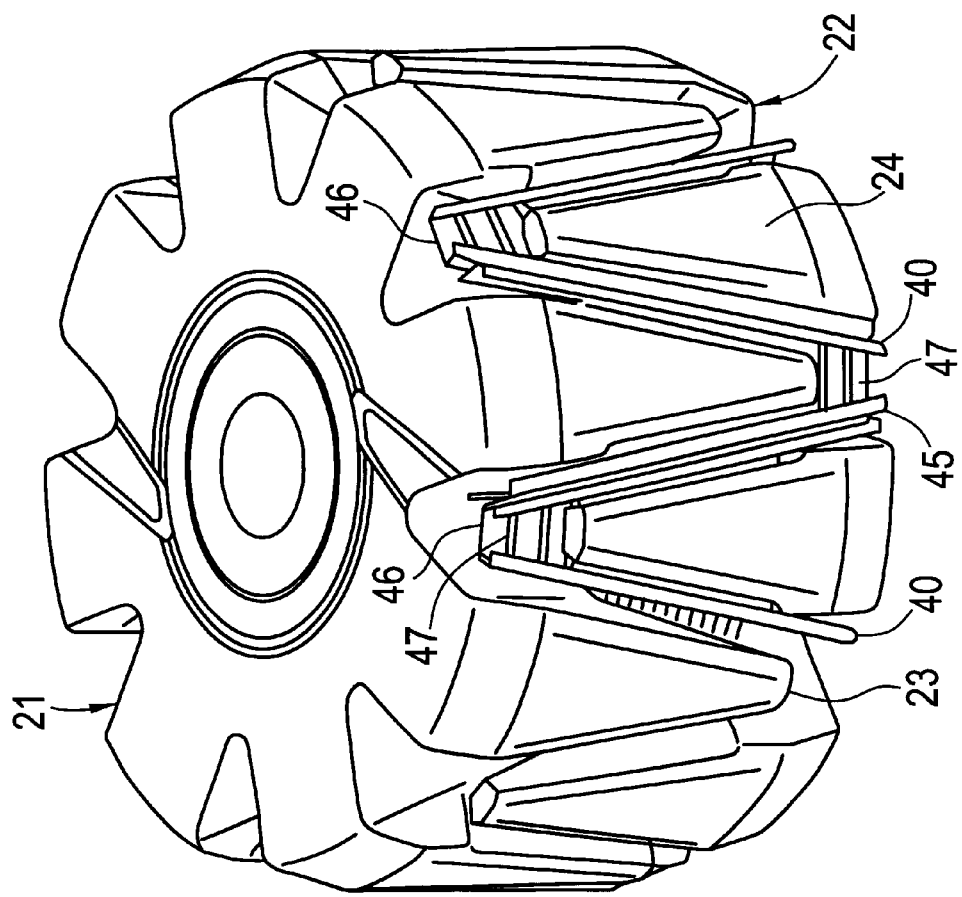
Figure 12:
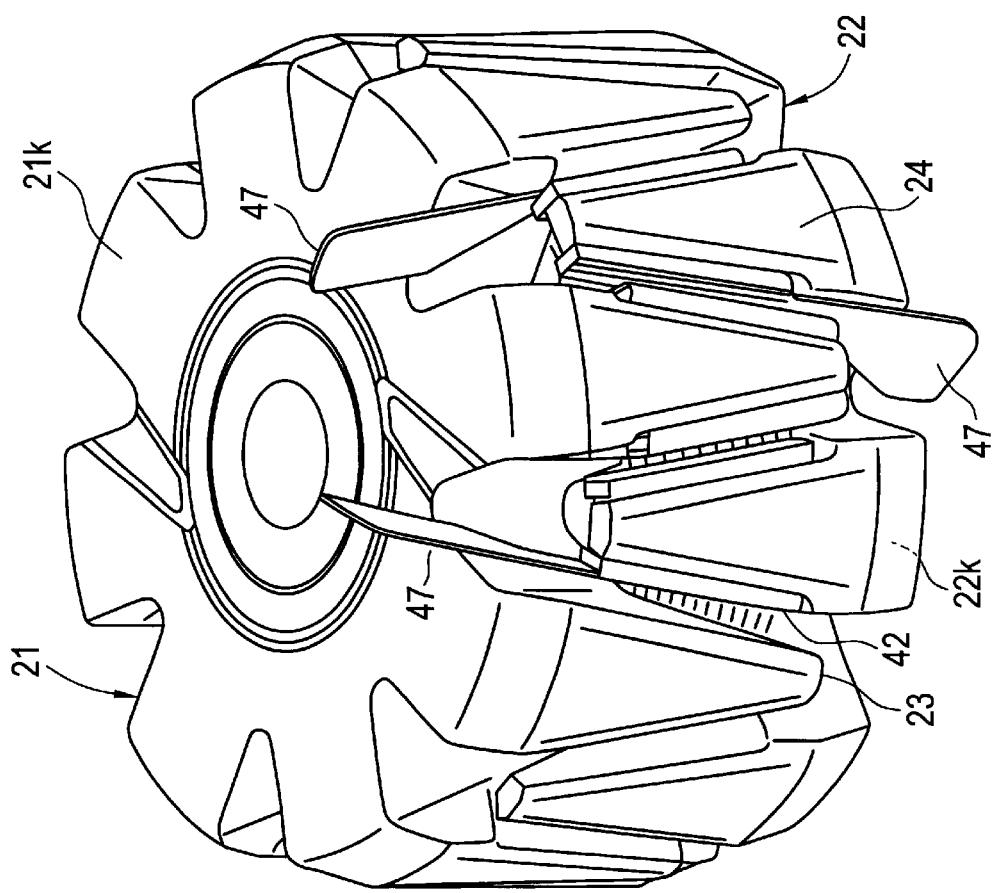
Figure 13:
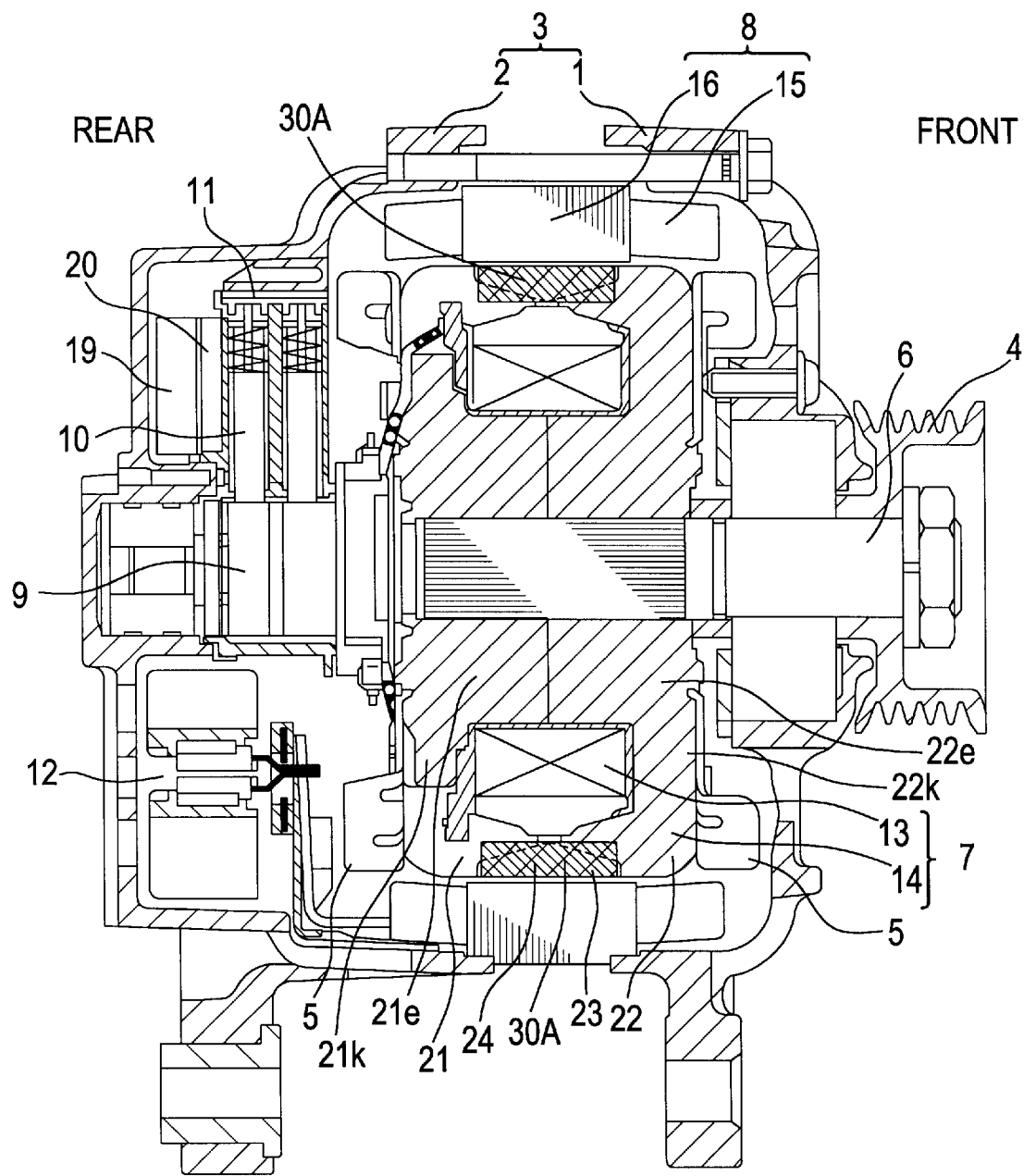
Figure 14:
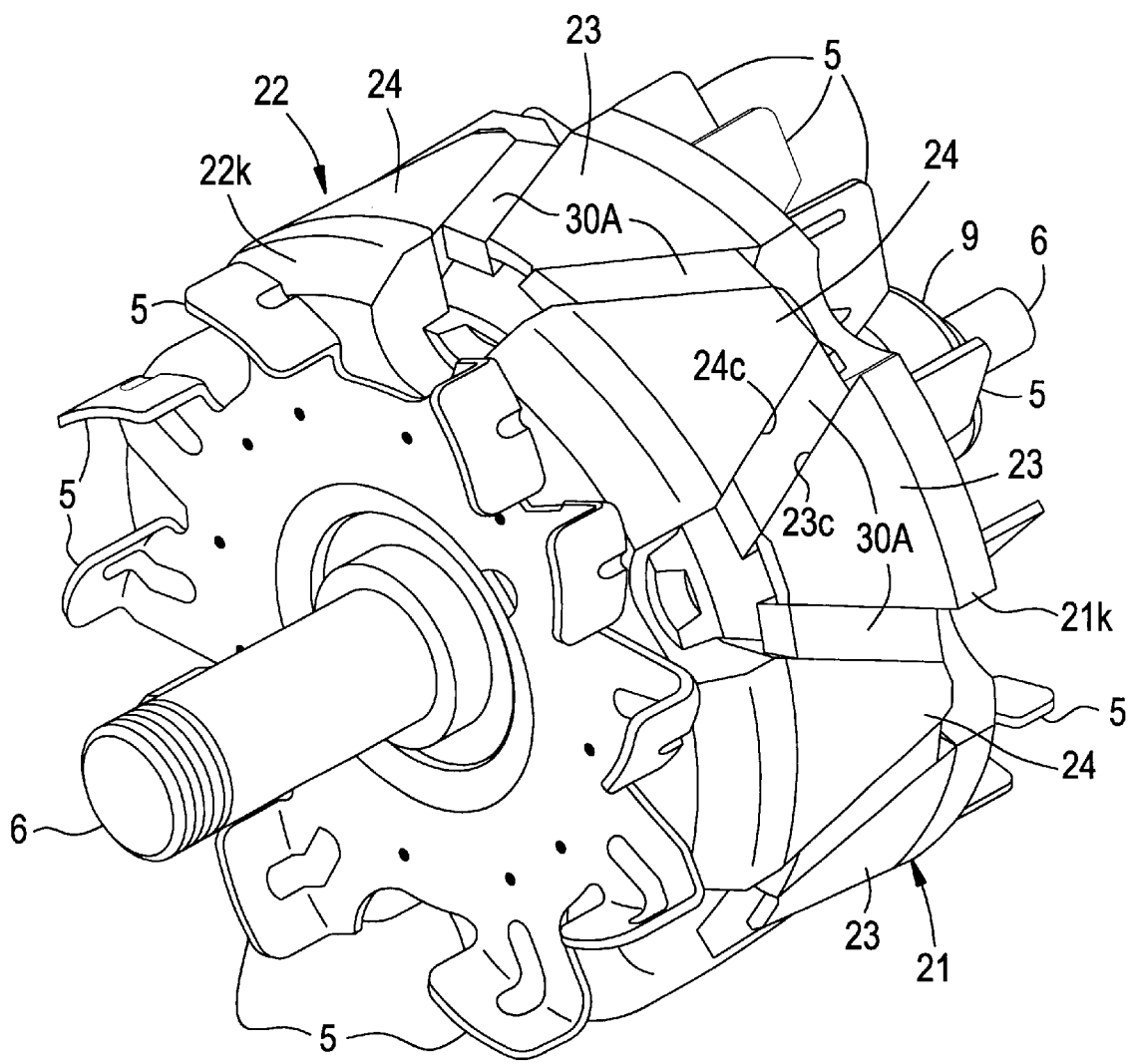
Figure 15:
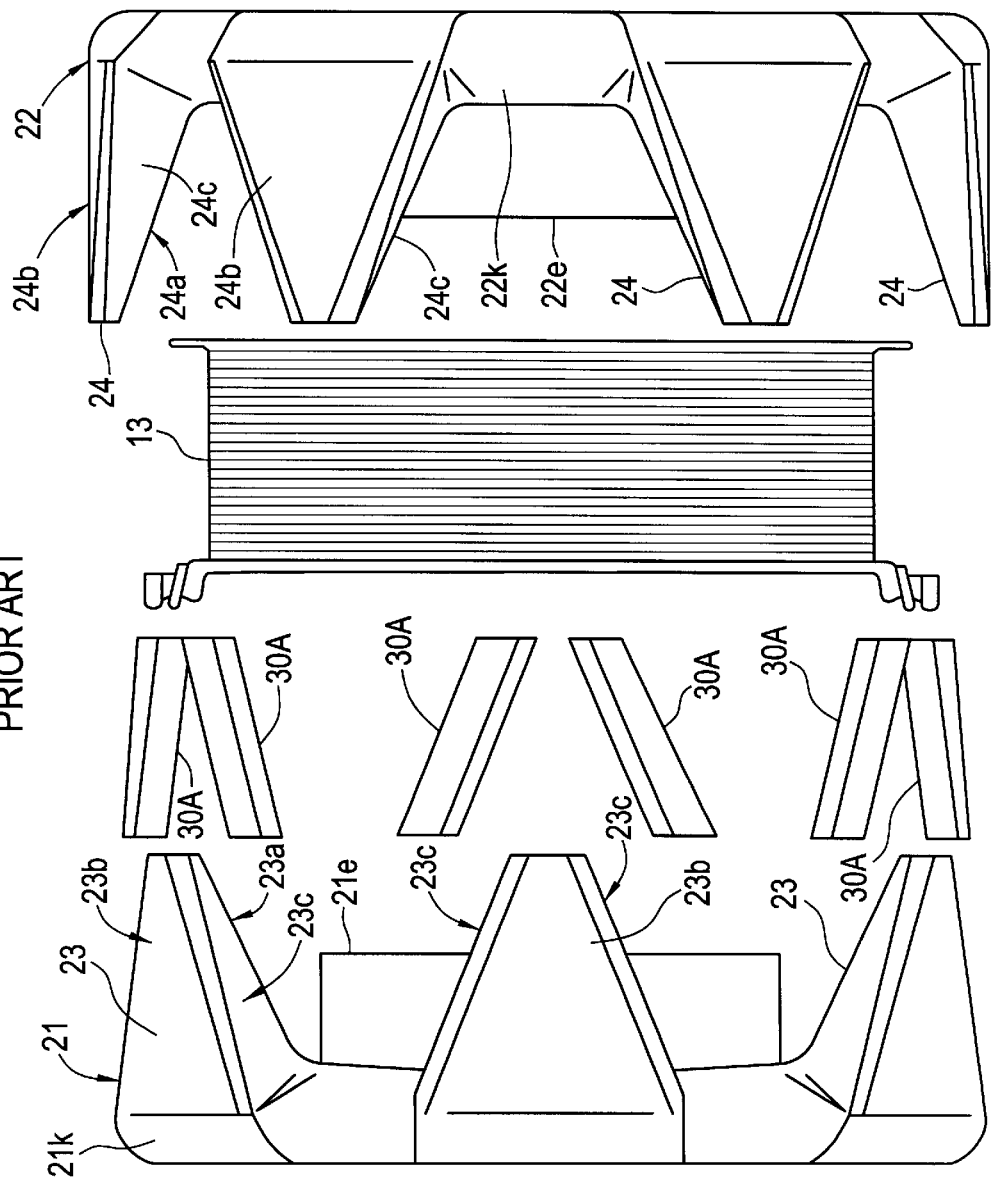
Figure 16:
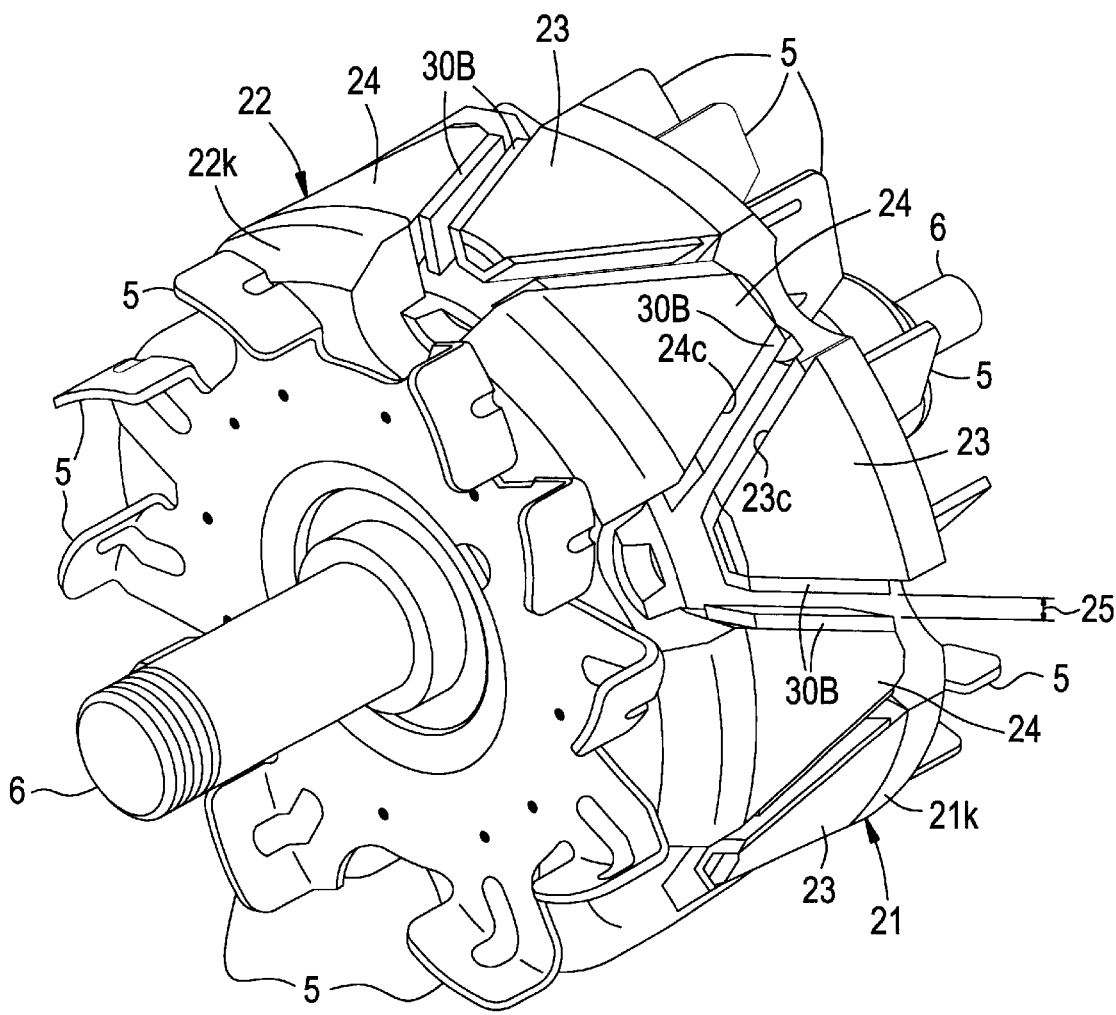
Figure 17:
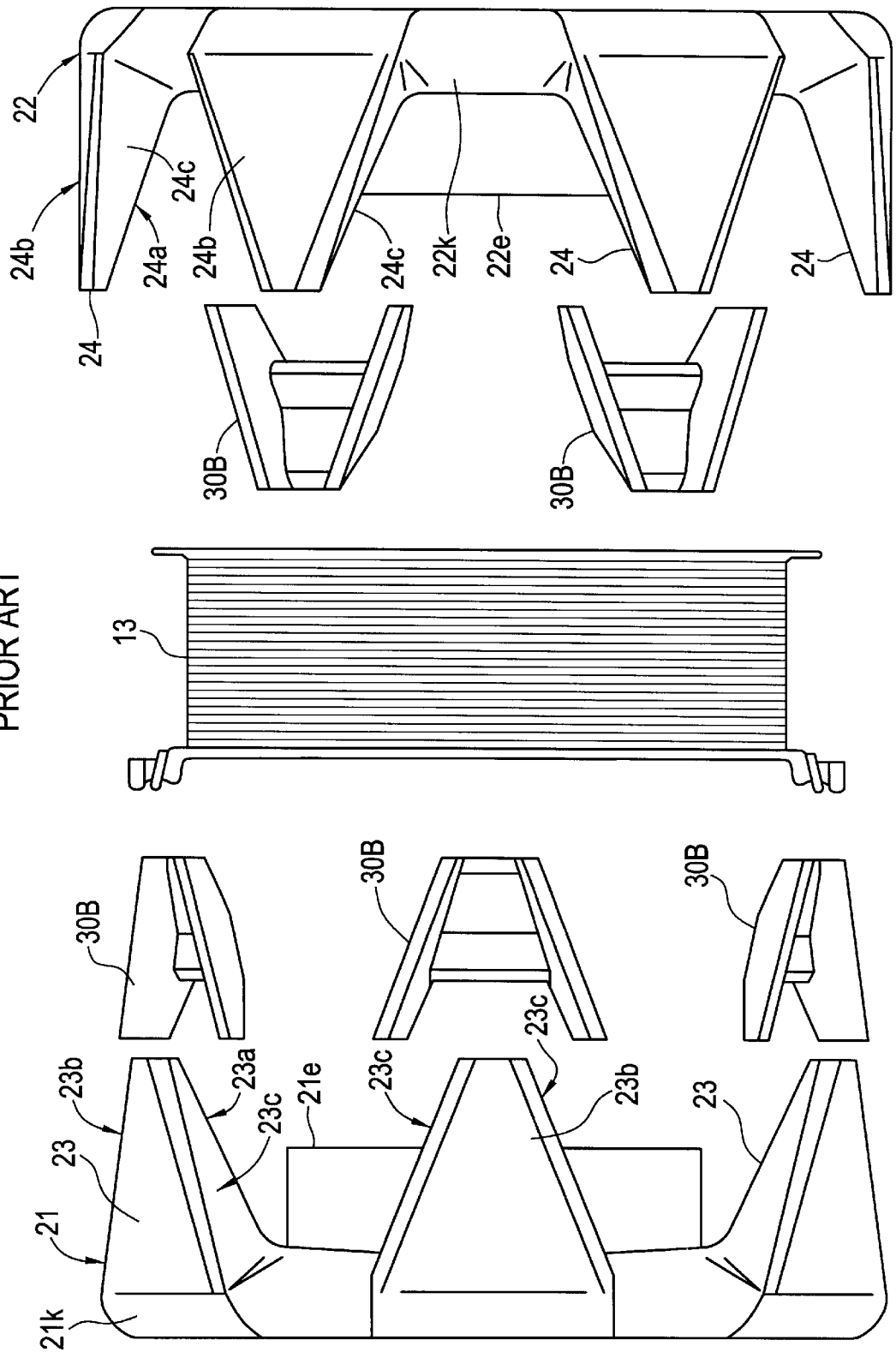
Figure 18:
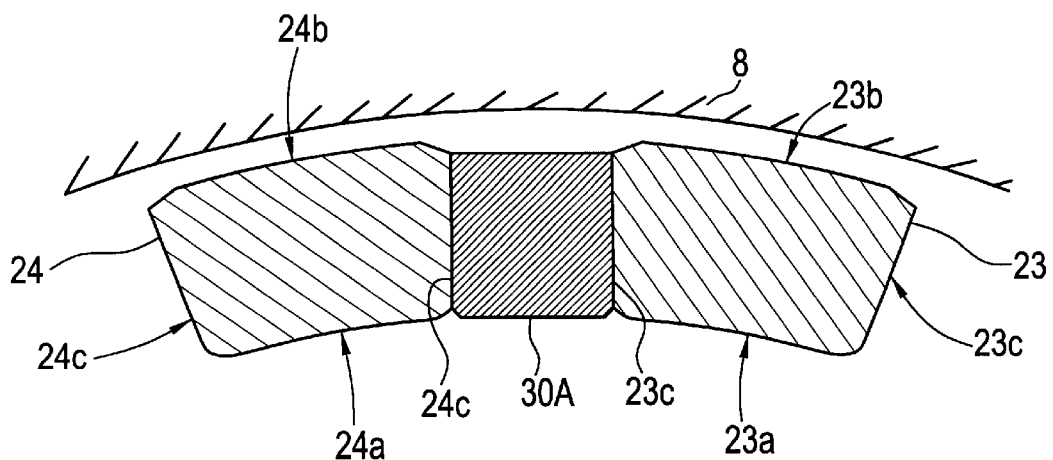

FIG. 6 (a) and (b) are a perspective view of Embodiment 1 of the present invention;

FIG. 7 is a perspective view of Embodiment 2 of the present invention;

FIG. 8 is a sectional view of Embodiment 2 of the present invention;

FIG. 9 is a perspective view of Embodiment 3 of the present invention;

FIG. 10 is a sectional view of Embodiment 3 of the present invention;

FIG. 11 is a perspective view of Embodiment 4 of the present invention;

FIG. 12 is a perspective view of Embodiment 5 of the present invention;

FIG. 13 is a sectional view of the prior art;

FIG. 14 is a perspective view of the prior art;

FIG. 15 is a side view of the prior art;

FIG. 16 is a perspective view of the prior art;

FIG. 17 is a side view of the prior art;

FIG. 18 is a sectional view of the prior art; and

Figure 19:
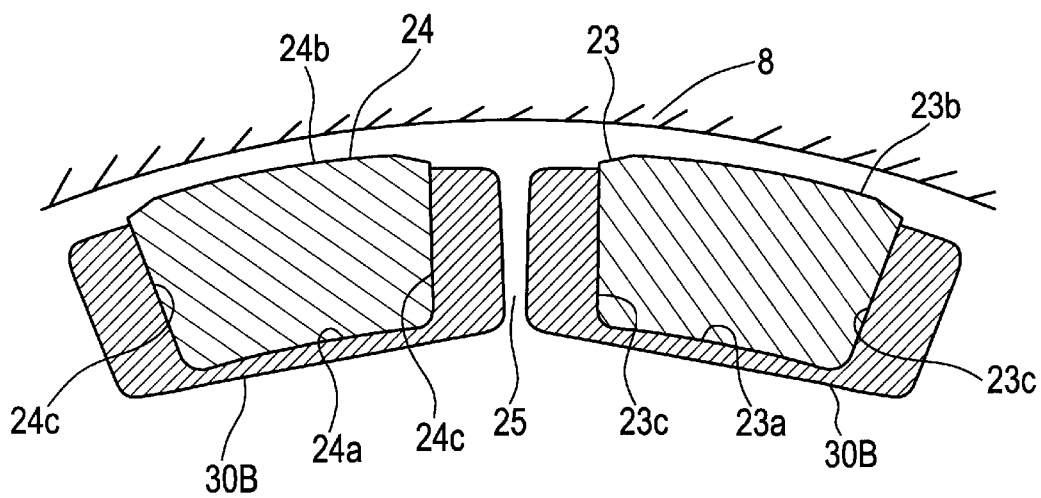

FIG. 19 is a sectional view of the prior art.

DETAILED DESCRIPTION OF THE PREFERRED EMBODIMENTS

Preferred embodiments of the present invention will be described hereinunder with reference to the accompanying drawings.

Embodiment 1

Figure 1:
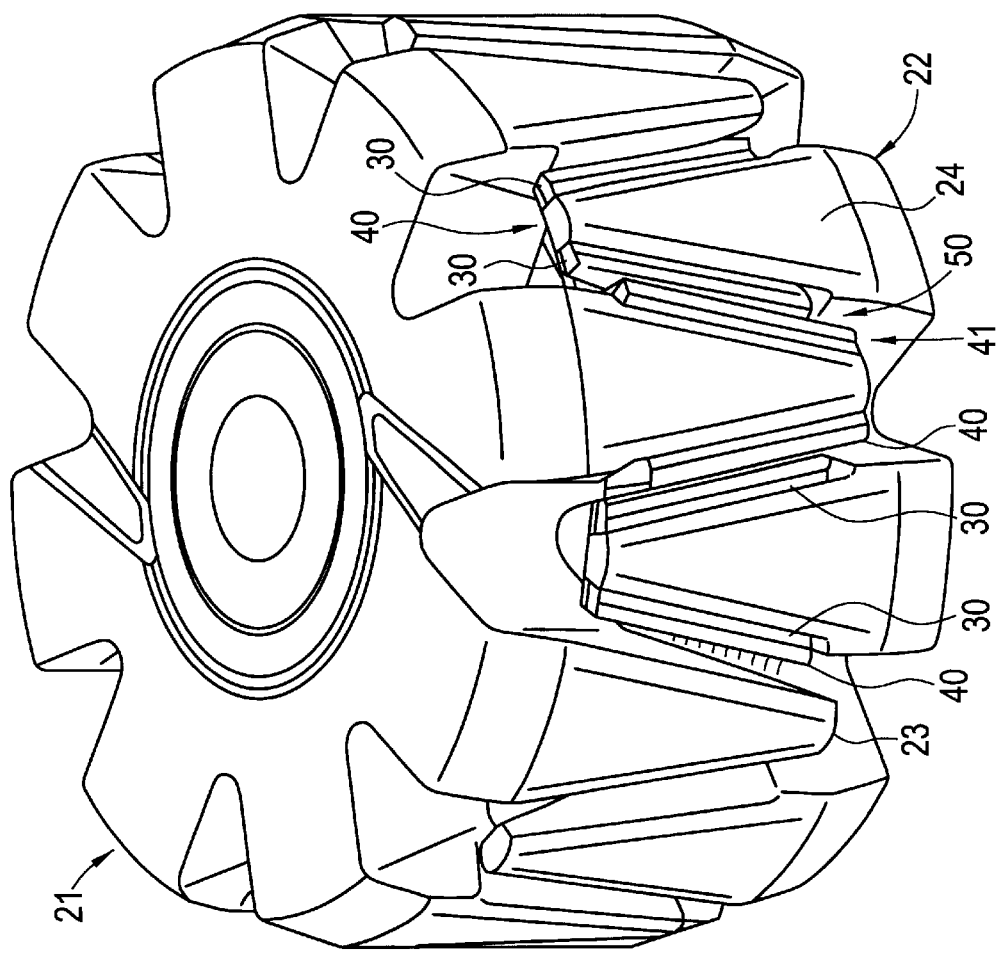
FIG. 1 is a perspective view of Embodiment 1 of the present invention.
Figure 2:
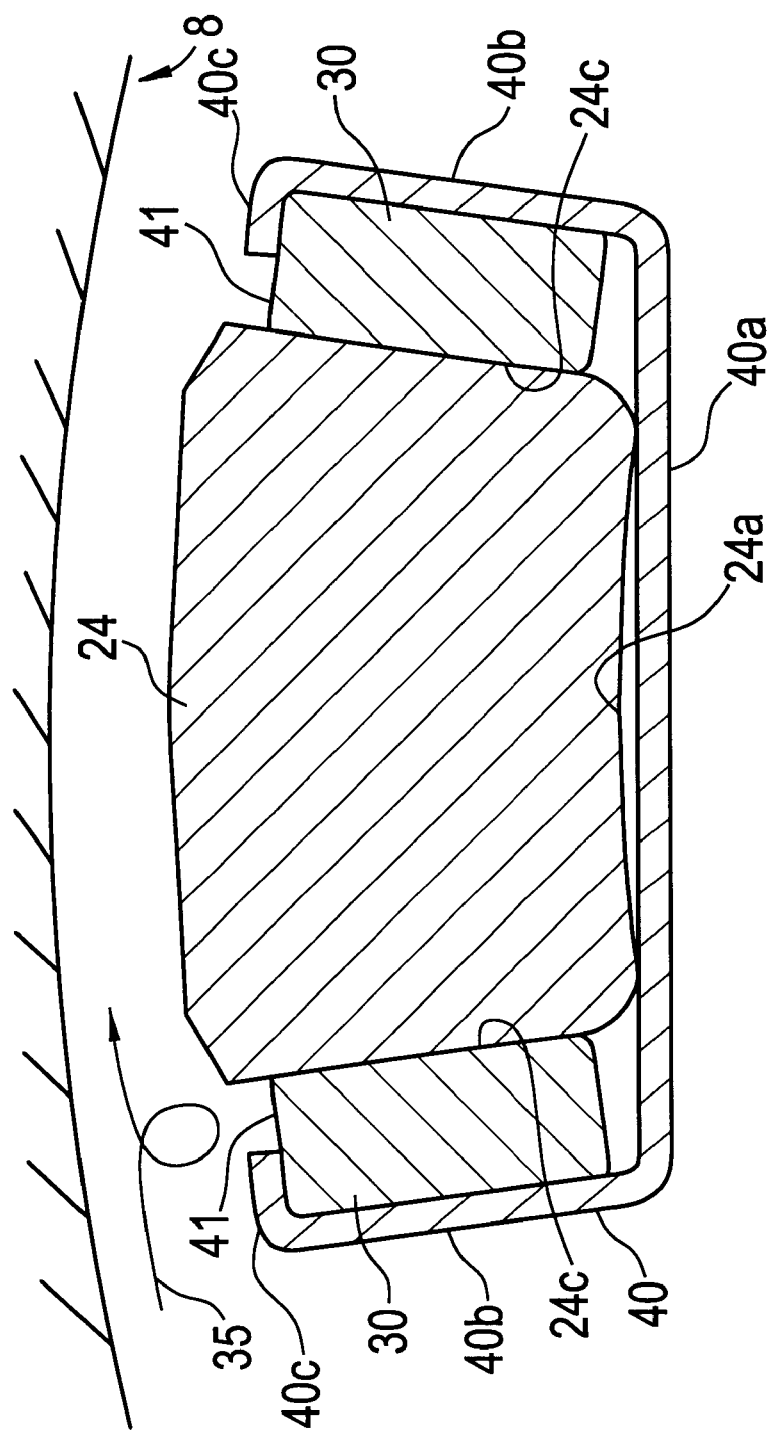
FIG. 2 is a sectional view of Embodiment 1 of the present invention.
Figure 3:
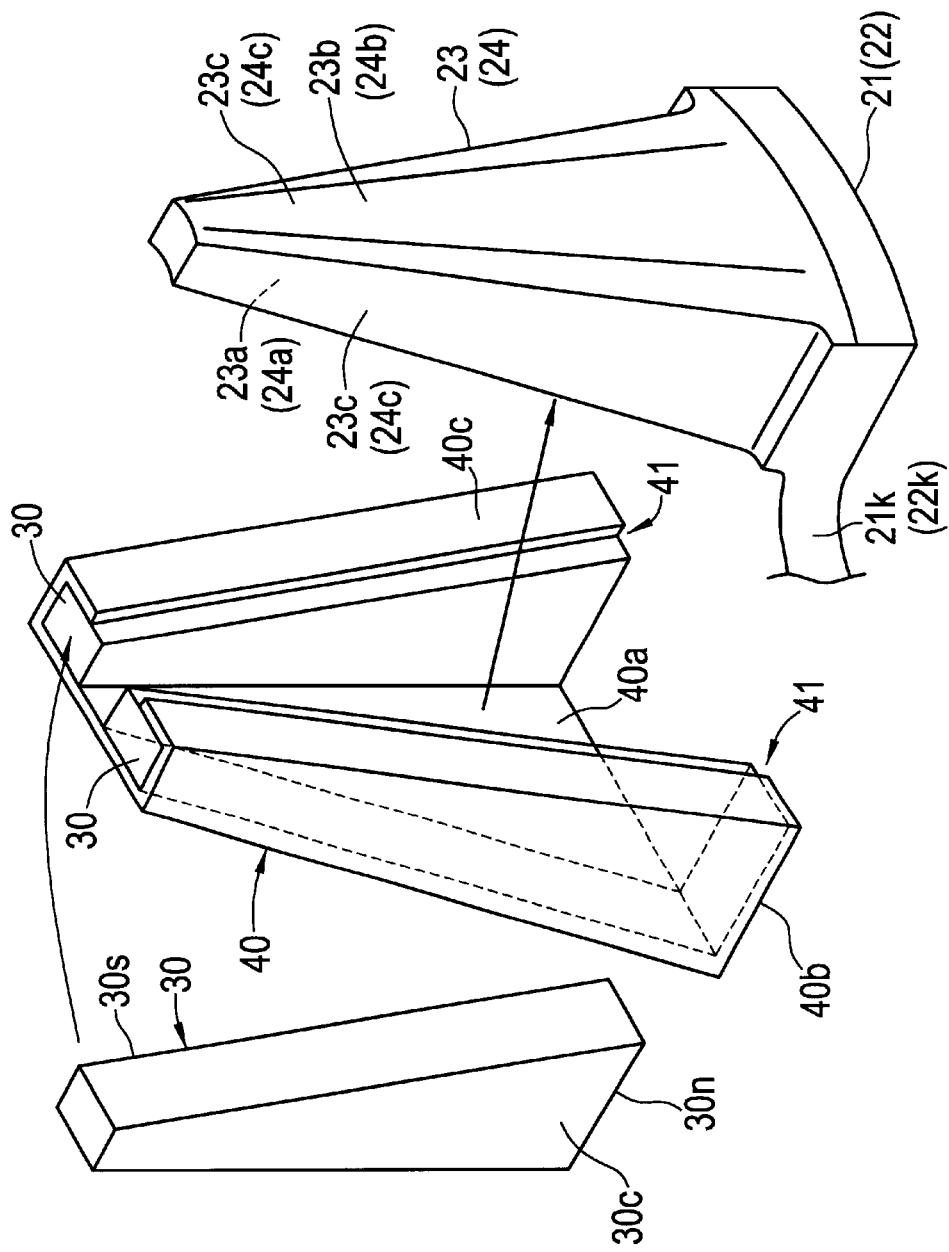
FIG. 3 is a perspective view of Embodiment 1 of the present invention.
Figure 4:
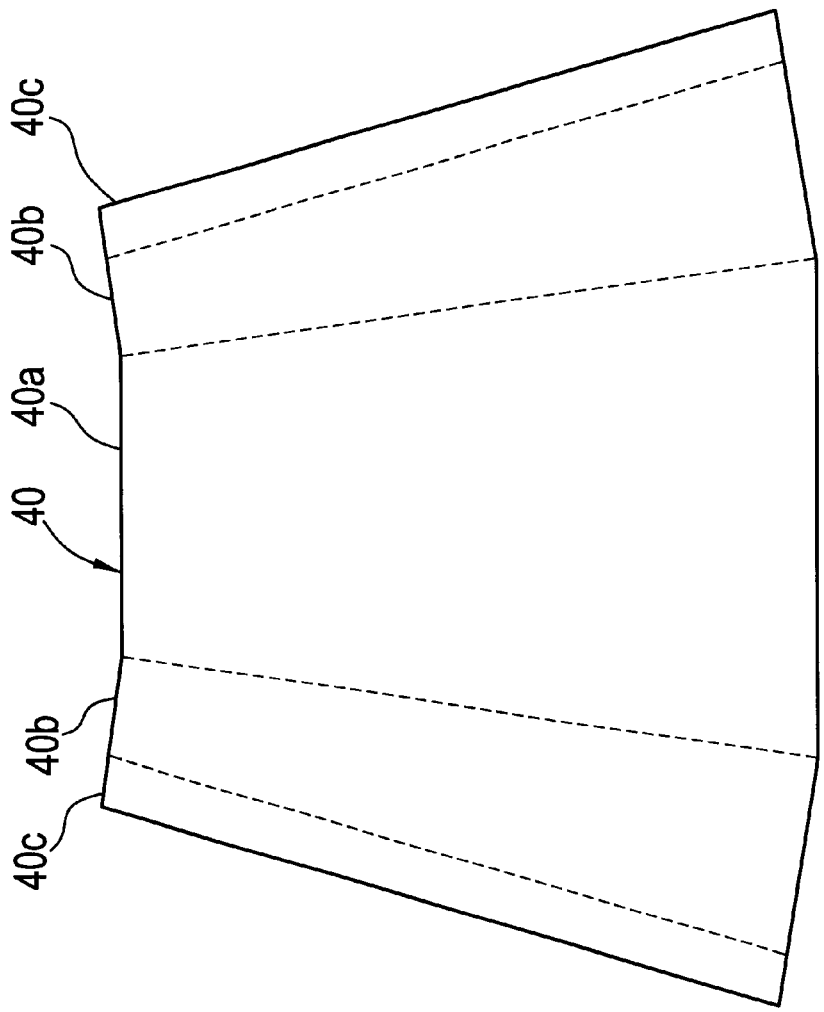
FIG. 4 is a plan view of Embodiment 1 of the present invention.

FIGS. 1 to 6 show a rotor structure for use in a car AC generator according to Embodiment 1 of the present invention. FIG. 1 is a perspective view of a rotor for a car AC generator. A shaft and a fan are omitted to make the rotor more understandable. FIG. 2 is a sectional view of a center portion of a claw-like magnetic pole when seen from the axial direction of the rotor, FIG. 3 is a perspective view showing the constitution of a magnet and a holding member, and FIG. 4 is a plan view of the metal material of the holding member. In these figures, the same or corresponding elements as those in FIGS. 13 to 19 are given the same reference symbols.

In Embodiment 1, as shown in FIGS. 1 to 3, a ferrite magnet 30 magnetized to suppress the leakage of a magnetic flux between claw-like magnetic poles 23 and 24 is placed on both side faces 23c and 23c of the claw-like magnetic pole 23 and both side faces 24c and 24c of the claw-like magnetic pole 24.

As shown in FIGS. 2 and 3, the magnets 30 are fixed to the claw-like magnetic pole 23 or 24 by a holding member 40 having a substantially C-shaped section and provided to cover the claw-like magnetic pole 23 or 24 from the inner face 23a or 24a. This holding member 40 serves as a heat sink to radiate heat transmitted to the claw-like magnetic pole 23 or 24 and cool the magnets 30 at the time of power generation.

An exposing portion 41 which is open on the outer side and almost parallel to an axial direction is formed in the holding member 40 to expose the magnets 30 to cooling air 35, thereby increasing a cooling effect to reduce an increase in the temperature of the magnet 30 at the time of power generation.

As shown in FIG. 3, the magnet 30 is shaped like a headed quadrangular pyramid. That is, the side face 30c in contact with the side face 23c or 24c of the claw-like magnetic pole 23 or 24 of the magnet 30 is trapezoidal in conformity with the side face 23c or 24c. The width of the magnet 30 is almost fixed but the thickness thereof increases from the end 30s side toward the root 30n side in conformity with the shape of the claw-like magnetic pole 23 or 24.

As shown in FIG. 4, the holding member 40 is produced by pressing a substantially trapezoidal stainless steel plate at positions shown by broken lines and comprises a trapezoidal portion 40a in contact with the inner faces of the magnets 30 and the inner face 23a or 24a of the claw-like magnetic pole 23 or 24, bent portions 40b bent from both ends of the trapezoidal portion 40a and holding the side faces of the magnets 30, and pressing pieces 40c projecting toward the claw-like magnetic pole 23 or 24 from the ends of the bent portions 40b and pressing the magnets 30 inward. The pressing pieces 40c extend to intermediate portions of the magnets 30, and there is a gap between the pressing piece 40c and the claw-like magnetic pole 23 and between the pressing piece 40c and the claw-like magnetic pole 24 to form the exposing portion 41 for exposing the magnets 30. The bent portions 40b of this holding member 40 and the side faces 23c or 24c of the claw-like magnetic pole 23 or 24 sandwich the magnets 30 to fix them to the claw-like magnetic pole 23 or 24.

To hold the magnets 40 by the holding member 40 and fix them to the claw-like magnetic pole 23 or 24, the boundary between the holding member 40 and the magnet 30 and the boundary between the holding member 40 and the claw-like magnetic pole 23 or 24, that is, the entire inner surfaces of the trapezoidal portion 40a and the bent portions 40b are coated with an adhesive.

As shown in FIG. 1, the bent portions 40b and 40b of the holding members 40 and 40 attached to the claw-like magnetic poles 23 and 24 are separated from each other and a space is formed between the holding members 40 and 40 to let cooling air 35 pass between the holding members 40 and 40.

Since the exposing portion 41 parallel to the axial direction is formed on the outer side of the holding member 40, a turbulent flow of the cooling air 35 flowing from the rear side to the front side is generated in the vicinity of the surface of the exposing portion 41 between the magnets 30 and the stator 8 at the time of the rotation of the rotor 7 as shown in FIG. 2, whereby the magnets 30 are directly cooled.

Generally speaking, the magnet 30 is easily affected by heat and hence, its magnetic force characteristics deteriorate at high temperatures. To maintain the characteristic properties of the magnet 30, the coolability of the magnet 30 may be improved sufficiently. Since the holding member 40 is formed of a metal plate, it serves as a cooling fin more or less. Since the magnet 30 may not be cooled completely, the exposing portion 41 is formed.

Further, since the holding member 40 is formed of a metal plate having excellent heat conductivity and serves to radiate heat transmitted to the magnet 30, it can cool the magnet 30, thereby making it possible to prevent deterioration in the magnetic force characteristics of the magnet 30. Even when the ends of the claw-like magnetic poles 23 and 24 move at the time of rotation, the magnet 30 is not applied with stress and is not broken.

A flow of heat generated at the time of power generation, for example, Joule heat of the rotor coil 13 is taken into consideration. First, this heat is transmitted to the base portions 21k and 22k through the cylindrical portions 21e and 22e of the pole core bodies 21 and 22. Thereafter, heat transmitted in such a manner that it spreads circularly into the base portions 21k and 22k reaches the claw-like magnetic poles 23 and 24. It further goes from the root portions to the end portions of the claw-like magnetic poles 23 and 24. Since the trapezoidal portion 40a of the holding member 40 formed of a metal plate having excellent heat conductivity is in contact with the inner face 23a or 24a of the claw-like magnetic pole 23 or 24, heat is transmitted to the holding member 40 which serves as a heat radiation plate and heat is not transmitted to the magnets 30 so much.

Since a magnetic flux is leaked between the claw-like magnetic poles 23 and 24 through the holding member 40 when the holding member 40 is made from a magnetic material, a magnetic material is not used for the holding member 40.

The formation of a fin portion for the magnet 30 is conceivable and this is possible if the magnet is a plastic magnet or the like which can be molded. However, when the magnet 30 is a general ferrite magnet which is produced by sintering, only a magnet having a simple shape can be produced. Therefore, it is impossible to form a fin in the ferrite magnet 30.

Figure 5:
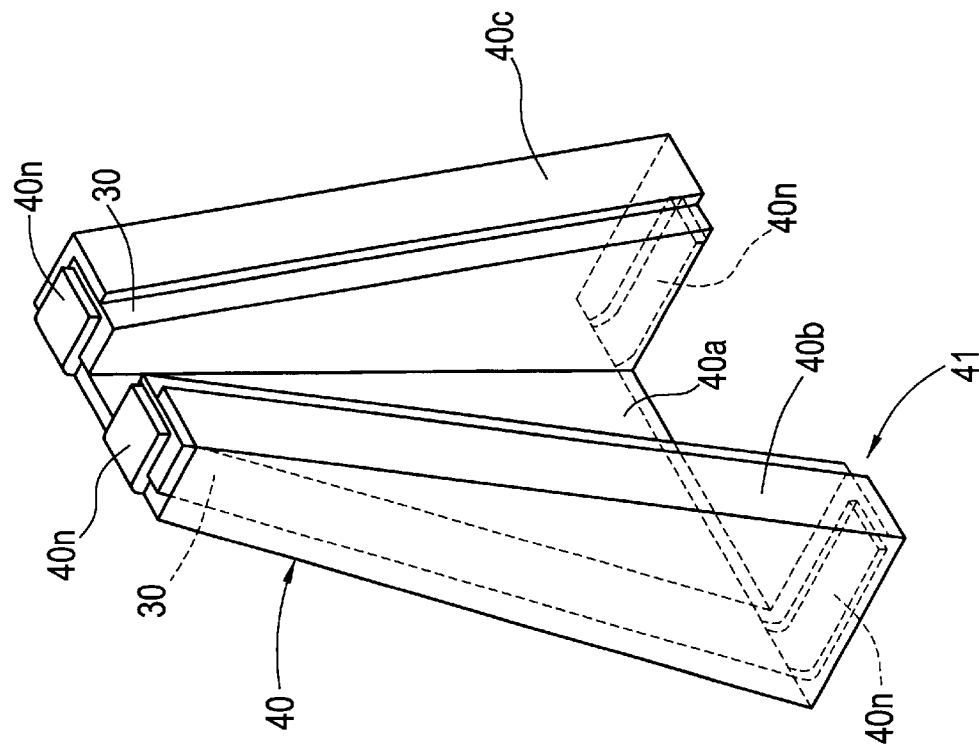
FIG. 5 is a perspective view of Embodiment 1 of the present invention.

The magnet 30 is fixed to the holding member 40 by an adhesive. As shown in FIG. 5, stopping portions 40n and 40n formed by bending both upper and lower ends of the trapezoidal portion 40a of the holding member 40 may be used to hold the magnets 30. The stopping portions may be provided at both upper and lower ends of the bent portions 40b. The holding member 40 is fixed to the claw-like magnetic pole 23 or 24 by an adhesive but may be fixed by soldering.

The exposing portion 41 is formed on the outer side of the holding member 40 but may be a slit hole formed on the outer side of the holding member to increase its surface area. As shown in FIGS. 6(A) and 6(B), holes 40h and 40h may be formed in the bent portions 40b of the holding member 40, that is, the inner face or side faces of the holding portion 40 as the exposing portions 41. The number of the holes 40h may be one or more and the holes may be formed in part or all of the holding member 40.

Embodiment 2

In the above Embodiment 1, the exposing portion 41 is formed on the outer side of the holding member 40. In Embodiment 2, as shown in FIG. 7 and FIG. 8, the magnets 30 are held by a holding member 42 having a substantially M-shaped section. A projecting piece 43 formed by cutting the holding member 40 and bending it outward in an axial direction like a window is provided on the outer side of the holding member 42 and serves as a plate-like fin, and a cut-away portion is open on the outer side as the exposing portion 41.

As shown in FIG. 8, the holding member 42 comprises a trapezoidal portion 42a which is formed in conformity with the inner face 23a or 24a of the claw-like magnetic pole 23 or 24, trapezoidal bent portions 42b which are bent from both ends of the trapezoidal portion 42a in conformity with the side faces 23c or 24c of the claw-like magnetic pole 23 or 24, pressing portions 42c which are bent from the bent portions 42b, press the magnets 30 inward and are provided with the projecting pieces 43, and folded portions 42d which are folded back from the pressing portions 42c and hold the magnets 30. The bent portions 42b and the folded portions 42d sandwich the magnets 30 and fix them to the claw-like magnetic pole 23 or 24.

When the holding member 42 is constituted as described above, cooling air 35 flowing between the rotor 7 and the stator 8 hits against the projecting pieces 43 during the rotation of the rotor 7 and the projecting pieces 43 serve as cooling fins. That is, heat transmitted to the holding member 42 from the claw-like magnetic poles 23 and 24 is radiated by the projecting pieces 43. Since this heat transmission path is formed, the coolability of the magnet 30 can be greatly improved. This holding member 42 contacts not only the inner face 23a or 24a of the claw-like magnetic pole 23 or 24 but also the side faces 23c or 24c of the claw-like magnetic pole 23 or 24, thereby improving its heat radiation effect.

The projecting piece 43 is formed on the pressing portions 42c of the holding member 42 but may be formed in the folded portions 42d of the holding member 42. Further, it may be formed on the trapezoidal portion 42a of the holding member 42 in such a manner that it is open on the inner side of the holding member 42. The projecting piece projecting outward maybe formed at the end of the pressing portion 40c of the holding member 40 shown in FIG. 2. Further, the projecting piece may be formed on the trapezoidal portion 40a or the bent portion 40b of the holding member 40. A plurality of the projecting pieces 43 may be formed.

Embodiment 3

In the above Embodiment 2, the projecting piece 43 is formed on the pressing portions 42c of the holding member 42. In Embodiment 3, the folded portions 42d of the holding member 42 are formed wavy.

This wavy portions 44 are produced by pressing the side portions of the holding member 42. Generally speaking, cooling air 35 flowing in by the rotation of the fan 5 is caused to flow into the claw-like magnetic poles 23 and 24 to cool the rotor coil 13 of the rotor 7. The cooling air 35 is applied to the wavy portions 44 which increase the surface area of the holding member 42. Thereby, coolability can be further improved.

The folded portions 42d of the holding member 42 are formed wavy but the pressing portions 42c of the holding member 42 may be formed wavy. Further, the trapezoidal portion 42a of the holding member 42 may be formed wavy or uneven.

Embodiment 4

In the above Embodiment 1, the holding member 40 is almost the same in size as the claw-like magnetic pole 23 or 24. In Embodiment 4, as shown in FIG. 11, the root portion or end portion of the holding member 40 is extended in the axial directions of the first and second pole core bodies 21 and 22 to form extension portions 45 and 46 projecting from the claw-like magnetic poles 23 and 24, respectively. Further, a slit 47 parallel to a circumferential direction is formed in the extension portions 45 and 46. Thereby, the extension portions 45 and 46 are cooled by cooling air 35 flowing between the claw-like magnetic poles 23 and 24 and a cooling effect can be further improved.

Embodiment 5

In the above Embodiment 4, the extension portions 45 and 46 of the holding members 40 extend to the end surface of the base portions 21k and 22k of the pole core bodies 21 and 22, respectively. In Embodiment 5, as shown in FIG. 12, the end of the folded portion 42d of the holding member 42 is extended to form a fan portion 47 projecting from the end surface of the base portion 21k or 22k of the first or second pore core body 21 or 22.

According to Embodiment 5, absorbed cooling air 35 hits against the fan portion 47 directly and cools the fan portion 47 easily. Since the quantity of heat transmitted to the cooling air 35 greatly increases, the coolability of the magnet 30 can be further improved. Since the fan 5 which is welded to the end surfaces of the base portions 21k and 22k of the pole core bodies 21 and 22 in the prior art is not necessary, thereby reducing the number of parts. Further, the number of rotor production steps including the processing of the end surfaces of the base portions 21k and 22k, the processing of the sheet metal of the fan 5 and the welding of the fan 5 can be greatly reduced, thereby significantly enhancing productivity.

The root of the folded portion 42d of the holding member 42 may be extended and projected from the end surface of the base portion 21k or 22k.

The case where the present invention is applied to the rotor of a car AC generator has been described. The present invention may be applied to the rotor of an ordinary AC generator or an AC generator.

As having been described above, according to the first aspect of the present invention, since the rotor structure comprises a rotor coil for generating a magnetic flux with a current, a pole core which is provided to cover the rotor coil and consists of first and second pole core bodies, each having claw-like magnetic poles which are situated to mate each other at positions where they cover the peripheral surface of the rotor coil, magnets which are provided on both sides of each of the claw-like magnetic poles and suppress the leakage of a magnetic flux between the side faces of the adjacent claw-like magnetic poles, and metal holding members each of which fixes the magnets to each of the claw-like magnetic poles in such a manner that it covers the magnets together with the claw-like magnetic pole and radiates heat transmitted to the claw-like magnetic pole at the time of power generation to cool the magnets, the quantity of heat radiated to the outer sides of the magnets is increased and the coolability of the magnets can be greatly improved.

According to the second aspect of the present invention, since an exposing portion for exposing part of the peripheral surface of the magnet is formed in the holding member so that the peripheral surface of the magnet can be contacted to cooling air, the quantity of heat transmitted to the magnet is greatly increased, thereby making it possible to significantly improve the coolability of the magnet.

According to the third aspect of the present invention, since the surface area of the holding member is increased to improve coolability, the quantity of heat transmitted to the holding member is increased, thereby making it possible to improve coolability.

According to the fourth aspect of the present invention, since projecting pieces are formed on the holding member or the holding member is formed wavy or uneven to increase its surface area in order to improve coolability, the quantity of heat transmitted to the holding member is increased, thereby making it possible to improve coolability.

According to the fifth aspect of the present invention, since the root portion or end portion of the holding member is extended in the axial directions of the first and second pole core bodies and projected from the claw-like magnetic poles, the quantity of heat transmitted to the holding member is increased, thereby making it possible to improve coolability.

According to the sixth aspect of the present invention, since the extension of the root portion or end portion of the holding member projects from the end surface of the first or second pole core body, the quantity of heat transmitted to the holding member is increased, thereby making it possible to improve coolability.

According to the seventh aspect of the present invention, since a cooling fan is formed on the extension of the root portion or end portion of the holding member which projects from the end surface of the pole core, the quantity of heat transmitted to the holding member is increased, thereby making it possible to improve coolability, reduce the number of parts and enhance productivity.

What is claimed is:

1. A rotor structure comprising:
   a rotor coil for generating a magnetic flux with a current;
   a first pole core;
   a second pole core;
   a plurality of magnets; and
   a plurality of holding members, wherein
      said first pole core and said second pole core each comprise a plurality of claw-like magnetic poles to cover said rotor coil, and wherein each claw-like magnetic pole of said first pole core and each claw-like magnetic pole of said second pole core are arranged in a peripheral direction on their respective first and second pole cores, each of said magnets is provided on respective peripheral outer side surfaces of each of said claw-like magnetic poles, each of said holding members being arranged annularly and separately and positioned to correspond to a respective claw-like magnetic pole, the number of said holding members being the same as that of said claw-like magnetic poles, each of said holding members comprises an inner holding part, a pair of outer peripheral holding parts, and a pair of outer radial holding parts, each of said inner holding parts is located on an inner side with respect to a radial direction of the claw-like magnetic pole and each of said inner holding parts holds an inner surface of said claw-like magnetic pole, each of said pairs of outer peripheral holding parts communicates with a respective inner holding part and holds respective outer peripheral surfaces of two magnets which are provided for a single claw-like magnetic pole, each of said pairs of outer radial holding parts communicates with a respective outer peripheral holding part and holds respective outer radial surface of said two magnets being provided for a single claw-like magnetic pole, and each of said plurality of holding members is separated from the other holding members in the peripheral direction with respect to said claw-like magnetic poles.

2. A rotor structure according to claim 1, wherein the inner radial holding member extends along inner surfaces with respect to the radial direction of said magnets and the outer peripheral holding members are formed from respective ends of the composite holding member being folded at the ends toward an outer side with respect to the radial direction and the outer radial holding members are formed by folding the respective outer peripheral holding members.

3. The rotor structure of claim 1, wherein an exposing portion for exposing part of the peripheral surface of the magnet is formed in the composite holding member.

4. The rotor structure of claim 1, wherein the surface area of the composite holding member is increased to improve its coolability.

5. The rotor structure of claim 4, wherein projecting pieces are formed on the composite holding member or the composite holding member is wavy or uneven to increase its surface area so as to improve its coolability.

6. The rotor structure of claim 1, wherein the root portion or end portion of the composite holding member is extended in the axial directions of the first and second pole core bodies and project from the claw-like magnetic poles.

7. The rotor structure of claim 6, wherein the extension of the root portion or end portion of the composite holding member projects from the end surface of the first or second pole core body.

8. The rotor structure of claim 7, wherein a cooling fan is formed on the extension of the root portion or end portion of the composite holding member which projects from the end surface of the pole core.

9. A rotor structure according to claim 1, wherein the outer radial holding parts and the outer peripheral holding parts are formed at a non-zero angle with respect to one another; said pair of outer radial holding parts are formed by folding edge portions of said holding members, and said pair of outer peripheral holding parts are formed by folding intermediate portions of said holding members.

10. A rotor structure according to claim 9, wherein the non-zero angle is ninety degrees.

11. A rotor structure according to claim 9, wherein the outer peripheral holding parts are perpendicular to the inner holding members.

12. A rotor structure comprising:

a rotor coil operable to generate a magnetic flux with a current;

a pole core covering the rotor coil and comprising a first pole core body and a second pole core body, each having claw-like magnetic poles situated to mate with each other at positions where they cover the peripheral surface of the rotor coil;

magnets provided on both sides of each of the claw-like magnetic poles operable to suppress the leakage of a magnetic flux between the side faces of the adjacent claw-like magnetic poles; and metal holding members each of which fixes the magnets in contact with each of the claw-like magnetic poles in such a manner that said holding members cover the magnets together with the claw-like magnetic poles and radiate heat transmitted to the claw-like magnetic poles at the time of power generation to cool the magnets, wherein a root portion or end portion of the holding member extends in the axial directions of the first and second pole core bodies and projects from the claw-like magnetic poles.

13. The rotor structure of claim 12, wherein the extension of the root portion or end portion of the holding member projects from the end surface of the first or second pole core body.

14. The rotor structure of claim 13, wherein a cooling fan is formed on the extension of the root portion or end portion of the holding member which projects from the end surface of the pole core.

* * * * *